Patented Aug. 31, 1937

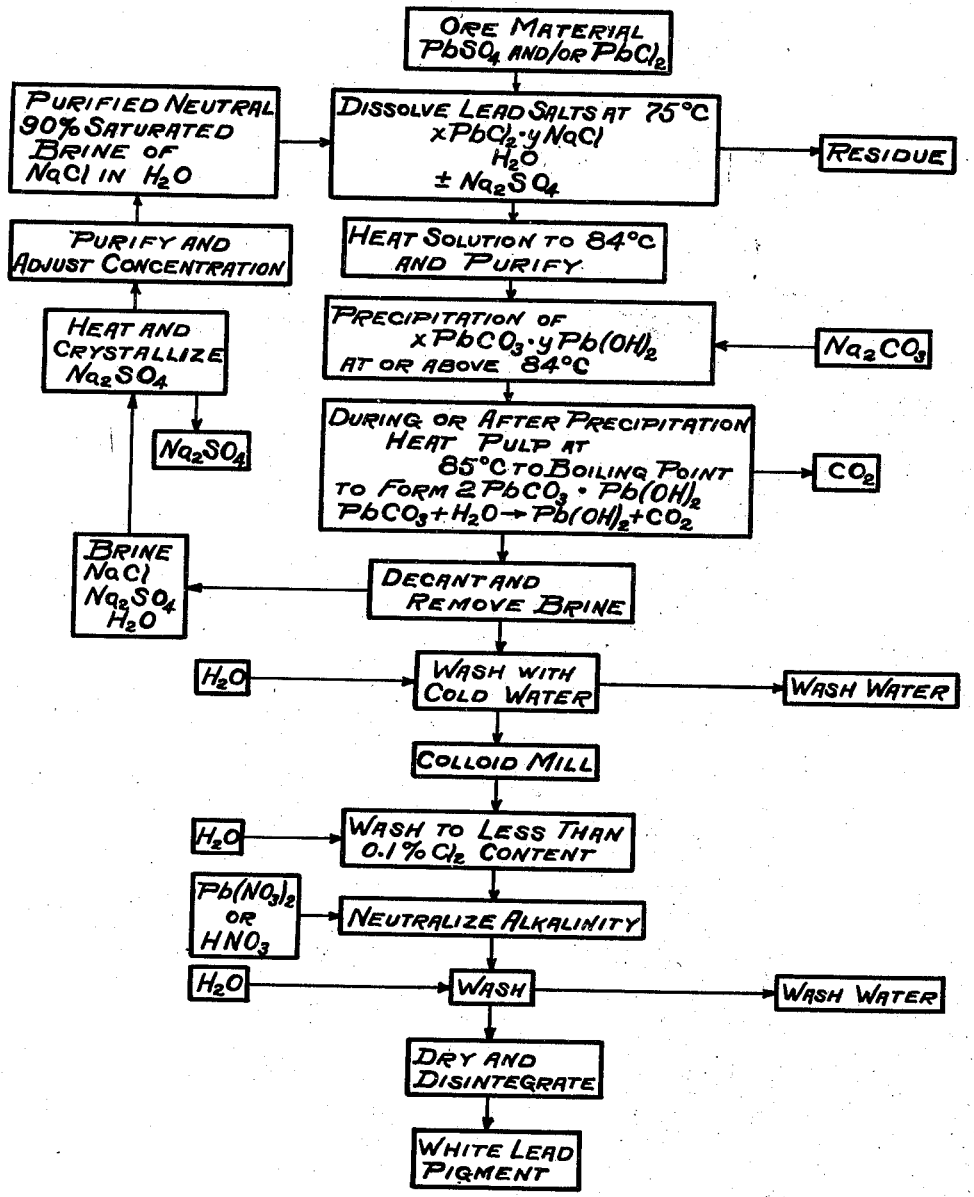

2,091,797

UNITED STATES PATENT OFFICE 2,091,797

METHOD OF MAKING WHITE LEAD PIGMENT

Royal L. Sessions, Los Angeles, Calif., assignor to Hughes-Mitchell Processes, Incorporated, Denver, Colo., a corporation of Wyoming Application January 10, 1935, Serial No. 1,181

8 Claims. (Cl. 23—71)

This invention relates to the manufacture of white lead for use as a pigment, and particularly to a method of converting the lead sulfate and/or chloride of an ore material to white lead.

White lead is considered to be a complex compound conforming substantially to the formula $2PbCO_3.Pb(OH)_2$. The commercial product often differs somewhat from this formula since desired pigmentive properties may be imparted thereto by a controlled variation in the ratio of the $Pb(OH)_2$ and the $PbCO_3$.

The primary object of this invention is to provide a method of making a white lead pigment, in accordance with which the characteristics of the white lead may be varied at will, and particularly a pigment which is of high quality in its resistance to weather, covering power, tinting strength, whiteness of color, and texture of the particles. A further object is to provide an economical and satisfactory procedure for making white lead of desired composition from a lead bearing ore material containing lead sulfate and/or chloride. Various other objects will be apparent in the following disclosure.

In accordance with this invention, I propose to make white lead of the required formula by a process which involves so treating a hot salt solution of lead sulfate and/or chloride as to precipitate lead carbonate, or lead hydroxycarbonate of the formula $xPbCO_3.yPb(OH)_2$, which has a larger proportion of carbonate than is required in the final product, and decomposing a part of the excess carbonate and thereby increasing the hydroxyl content of the white lead, this being preferably done by heating the precipitate to a temperature between 84° C. and the boiling point of the liquor in which it is suspended during or immediately following the step of precipitation. By carefully controlling this decomposition, a desired ratio of $PbCO_3$ to $Pb(OH)_2$ may be obtained. Thereafter, the precipitate is so treated as to give it required pigmentive properties.

The accompanying drawing gives as a flow diagram a preferred method of carrying out this procedure, but it will be understood that variations in the process may be made within the scope of the appended claims and that the drawing is merely illustrative of one phase of this invention.

The white lead is to be made from an ore material or other suitable source of lead comprising lead sulfate and/or lead chloride. These two compounds go into solution in a hot alkali metal chloride brine, and the lead may be precipitated from this brine solution as a carbonate or hydroxycarbonate. When lead sulfate or lead chloride is dissolved in a strong sodium chloride brine, it is presumed that a compound of the formula $xPbCl_2.yNaCl$ is present in the solution, as such a compound crystallizes out when the solution is cooled. If strong solutions of a lead-sodium chloride brine and sodium carbonate are mixed, a basic lead carbonate is rapidly precipitated, but the product does not have the correct formula for white lead and it is likely to be contaminated with the initial solutions. It is, therefore, one object of this invention to so carry on this procedure that the white lead will not contain lead chloride, sodium chloride or a complex compound of the two and that it have the required composition.

To these ends, it is desirable to leach the lead bearing ore material at approximately 75° C. by means of a concentrated brine, and preferably a sodium chloride brine which is 85% to 95% saturated at 20° C., until the resultant solution is substantially saturated with lead at the temperature of 75° C. This leaching operation may be carried on by suitable procedure, such as is involved in placing the finely divided ore material in a tank and circulating the hot salt brine therethrough until the required amount of lead has been dissolved. Thereafter, upon raising the temperature to 84° C. or higher, the solution becomes unsaturated with respect to both the lead and the sodium ions, and the complex salt will not crystallize out during the subsequent purification and precipitation steps. If lead sulfate is dissolved in the brine, there will be sulfate ions present, but the required results will be accomplished satisfactorily in their presence if their concentration is not too high. It, however, is desirable in order to produce a cyclic process that as sodium sulfate accumulates in the brine, it be periodically separated therefrom, such as by evaporating the brine and crystallizing out the sodium sulfate and removing the same. Then, the resulting brine may be returned to process after being otherwise purified and brought to the desired concentration for leaching more ore or dissolving more lead sulfate and/or chloride. It is also to be understood that both the original salt brine and the lead solution are to be purified of those undesired ingredients which might precipitate during the subsequent steps of the process, and this purification may be effected in accordance with any suitable standard procedure.

For the precipitation of the lead carbonate, the lead-sodium chloride brine is to be treated with a strong solution of sodium carbonate or equivalent reagent, such as potassium carbonate which may be used in case the lead is dissolved in a potassium chloride solution. Under the conditions of the process, this step results in the formation of lead hydroxycarbonate or a basic carbonate of a variable formula, herein termed a carbonate. It is not necessary that this carbonate have any particular composition except that, in this formula $xPbCO_3.yPb(OH)_2$, there be insufficient hydroxyl content to form white lead. Hence, it is preferred to have the ingredients mixed in those proportions which will give the required composition under the conditions of the process. The sodium carbonate may be added in the stoichiometric amount required for making $PbCO_3$, but an hydroxyl compound will be formed to some extent. The reaction is carried on with the temperature above 75° C. and while rapidly stirring or agitating the solution as the precipitation takes place. This serves to break up the precipitate and to insure penetration of the lead carbonate by the solutions and thus minimizes the amount of occluded salts thereon.

In order to cause the lead hydroxycarbonate as thus precipitated to be converted to the desired formula, the precipitate is heated while suspended in an aqueous bath, and preferably in the same salt brine in which it was precipitated, to that temperature at which it decomposes and forms lead hydrate. That is, the temperature of the bath carrying the lead carbonate in suspension is raised to that point between 85° C. and the boiling point of the bath at which carbon dioxide will be evolved from the lead carbonate and the product hydrated to the required extent. By periodically analyzing the pulp of precipitate and solution as the reaction proceeds, one may stop the process at that point at which the desired composition has been attained. The evolution of carbon dioxide may be increased or decreased by raising or lowering the temperature. At the boiling point of the bath, the $CO_2$ will be evolved very rapidly. Consequently, one may control the rate of conversion by limiting the temperature and, therefore, the rate of evolution of the carbon dioxide gas, to that at which one may easily follow the change in composition by suitable analytical procedure. It is to be understood that the step of heating the precipitate to a temperature between 85° C. and the boiling point of the solution may be carried on either after or simultaneously with the step of precipitating the lead hydroxycarbonate. In the preferred process, the initial precipitation is carried on at a temperature above 84° C. But in either case, heat is applied during or after the addition of the reagent sodium carbonate until sufficient $CO_2$ has been evolved to lower the carbonate content of the precipitate to the required formula.

It is to be observed that the lead carbonate is presumed to be hydrated and that in decomposing, hydroxyl takes the place of the carbon dioxide evolved, thus converting the carbonate to the hydrate. The water of hydration aids in holding the carbonate and hydroxyl together in a compound or at least in intimate association. Consequently, the pigment particle is made up of a crystalline structure which is substantially molecular in its arrangement.

The sodium carbonate used for precipitating the lead carbonate may be derived from various sources, whether natural or artificial, and its solution may contain harmless ions, such as sulfates and chloride ions, because of their presence in the lead salt brine. It may be used as a dry salt or in solution. It, however, is to be noted that the salt brine used for dissolving the lead should not have an acid or alkaline reaction but should be neutral. If it were acid, it might dissolve iron and other undesired substances from the ore material and thus affect the product. An alkaline reaction would tend to precipitate lead within the ore material as an oxychloride and so cause it to be lost during the leaching and purification steps. Likewise, if the sodium carbonate is derived from a natural deposit, it should be suitably purified depending on its initial composition. This process is particularly suited for using natural brines or dry salt deposits, such as trona, because the different ions are either useful or substantially inert in the process. The chlorine ions found in a trona solution remain in the brine after the white lead has been prepared and then go back to the step of dissolving more lead sulfate and/or chloride. The sulfate ions in the trona are separated out of the brine by crystallization of the sodium sulfate. This salt may in turn be used in the formation of hydrochloric acid for chloridization of a complex ore containing lead and zinc. Thus, such a natural salt provides the chief reagents in the process and renders it efficient and economical.

After the white lead of required composition has been formed, the brine is separated therefrom and preferably by decantation, so that the brine will not be diluted and may be used cyclically in the process. This brine may be treated as above explained to remove a part of the sodium sulfate present, if the ore material contained lead sulfate or if trona was used, and the brine after the removal of the sulfate may be otherwise purified. Then its concentration is adjusted and it is again ready for use in dissolving more lead.

The white lead precipitate may be washed with water of a neutral reaction, which is preferably accomplished by settling the pulp and decanting until the weak wash water contains not over one gram per liter of chlorine content in the form of a chloride. It is desirable that this chlorine content be reduced to a satisfactory minimum. The washing operation may be aided by running the pulp through a colloid mill, which materially assists in the washing operation by freeing the entrained or occluded chloride, because of the loosening up of the lead particles and reducing them to a desired commercial size. This colloid mill may be of any suitable construction adapted to grind or to disintegrate the pulp to a finely divided condition, as is required in pigments. It may comprise a grooved rotor rotated by an electric motor at a high speed relative to the stator and between which the material flows and is pulverized, such as the Charlotte colloid mill which is to be found on the market. After passing the material through the colloid mill, it may be again washed with cold water under the same alkaline conditions, this being preferably accomplished by settling the material and decanting until the white lead contains less than 0.1% of chlorine content calculated on the dry weight basis.

After the lead hydroxycarbonate has been converted to white lead, it shows a slight permanent alkalinity. During the step of washing the pulp, this alkalinity increases and is present at the end of the washing stage. In order to neutralize this alkalinity, lead nitrate or nitric acid may be added in a required amount. Thereafter, the pulp is again washed with water to remove all soluble salts which are present, such as lead nitrate or sodium nitrate. In order that the wash water may not contain impurities which would be precipitated by the white lead during the washing operation, this wash water is preferably initially treated with a thoroughly washed and undried white lead of a previous manufacture and then filtered to remove any precipitate. Such precautions serve to produce a product of high purity. After the final washing operation, the white lead pulp is now ready for drying and disintegration or otherwise being prepared for use on the market.

Having thus described the invention, what is claimed as new and desired to secure by Letters Patent is:

1. The method of making white lead pigment comprising the steps of providing a hot strong neutral solution of a substance selected from the group consisting of lead sulfate, lead chloride and a mixture thereof in an alkali metal chloride brine, maintaining the solution at that temperature above 75° C. at which it is unsaturated, and treating it with a carbonate of an alkali metal and precipitating lead hydroxy-carbonate with insufficient hydroxyl content to form white lead, and heating the precipitate suspended in an aqueous bath to a temperature between 85° C. and the boiling point of the bath and causing a controlled decomposition of the lead hydroxy-carbonate and the hydration of the precipitate until the approximate composition of white lead has been obtained.

2. The method according to claim 1 in which the lead hydroxy-carbonate is initially precipitated at a temperature above 84° C., after which the salt brine carrying the lead hydroxy-carbonate in suspension is maintained at an elevated temperature to cause evolution of carbon dioxide gas and the conversion of the precipitate to white lead of a desired composition.

3. The method according to claim 1 in which lead salt is dissolved in a nearly saturated brine of sodium chloride at a temperature of about 75° C. and the temperature is thereafter held at 84° C. or higher while the solution is treated with sodium carbonate added for the purpose and proportioned in amount to precipitate all of the lead as a hydroxy-carbonate, and in which the brine containing the lead hydroxy-carbonate in suspension is thereafter held at a temperature above 84° C. until the desired composition has been obtained as determined by tests of samples thereof.

4. The method of making white lead comprising the steps of dissolving a substance selected from the group consisting of lead sulfate, lead chloride and a mixture thereof in a hot concentrated sodium chloride brine which is substantially saturated with respect to the lead ions, thereafter raising the temperature to a temperature above 75° C. to provide a solution which is not thus saturated, then treating the heated solution with sodium carbonate added in amount sufficient to precipitate the lead as lead hydroxy-carbonate, heating the lead hydroxy-carbonate in suspension in said brine to a temperature above 84° C. and causing a controlled evolution of carbon dioxide gas and the conversion of the lead hydroxy-carbonate to white lead of approximately the composition corresponding to the formula $2PbCO_3.Pb(OH)_2$, and thereafter separating the precipitate from the bath and preparing a pigment powder therefrom.

5. The method of claim 4 in which the white lead, after the heating operation, is removed from the brine and washed with water until its chloride content is less than 0.1% and it is thereafter dried and prepared for use as a pigment.

6. The method of treating an ore material and making white lead comprising the steps of dissolving from an ore material a substance selected from the group consisting of lead sulfate, lead chloride and a mixture thereof by means of a hot strong sodium chloride brine and forming a substantially saturated solution thereof at a temperature in the vicinity of 75° C., raising the temperature of the lead bearing brine to produce an unsaturated condition, treating the solution with trona containing the chloride, the sulfate and the carbonate of sodium and precipitating lead hydroxycarbonate, maintaining the brine at a controlled temperature above 84° C. until the approximate composition of white lead has been obtained, separating the precipitate from the resultant brine and thereafter leaching with the brine a further amount of ore material for repeating the cycle.

7. The method of claim 6 in which the trona contains the sulfate, the chloride and the carbonate of sodium and the lead hydroxycarbonate is precipitated in the presence of all of said salts, after which the brine is treated to remove sulfate ions derived from either the ore or the trona and the resultant brine containing sodium chloride has its concentration and temperature adjusted for leaching more ore material.

8. The method of making white lead according to claim 6 in which the lead hydroxycarbonate is precipitated with insufficient hydroxyl content to form white lead and the pulp of precipitate and brine is heated to a temperature between 85° C. and the boiling point of the solution until the precipitate is converted to the approximate composition of white lead.

ROYAL L. SESSIONS.